United States Patent [19]
Van Den Avoort

[11] 4,200,887
[45] Apr. 29, 1980

[54] TELEVISION CAMERA
[75] Inventor: Pieter M. Van Den Avoort, Eindhoven, Netherlands
[73] Assignee: U.S. Philips Corporation, New York, N.Y.
[21] Appl. No.: 934,517
[22] Filed: Aug. 17, 1978
[30] Foreign Application Priority Data
Sep. 2, 1977 [NL] Netherlands ............... 7709662
[51] Int. Cl.² ............................................. H04N 5/14
[52] U.S. Cl. ................................................. 358/162
[58] Field of Search ....................... 358/209, 160, 162
[56] References Cited
U.S. PATENT DOCUMENTS
4,090,218  5/1978  van Buul et al. ............... 358/162
4,127,877  11/1978  Morishita et al. ............... 358/162

Primary Examiner—Richard Murray
Attorney, Agent, or Firm—Thomas A. Briody; William J. Streeter; Edward W. Goodman

[57] ABSTRACT

A television camera in which during picture pick-up a same, non-interlaced line raster of lines of half the standard line period are processed in a standard field period. Thereafter signal processing such as a vertical aperture correction and/or an interlace-flicker reduction, takes place in an advantageous manner without a field period delay for improving the picture quality by combining the information of spatially directly adjacent lines. Thereafter signal expansion of the information from half the standard line periods to the standard line periods take place so that ultimately a video signal in accordance with the standard is obtained.

6 Claims, 2 Drawing Figures

TELEVISION CAMERA

BACKGROUND OF THE INVENTION

The invention relates to a television camera comprising a picture pick-up device, a scanning signal generator for the line or field scanning respectively during the line-by line and field-by-field conversion by the pick-up device of optical picture information into a video signal occurring with line and field periods laid down in a television standard and a signal processing circuit for improving the picture quality on display by combining information of adjacent lines for forming the video signal.

A television camera comprising a signal processing circuit arranged for performing a vertical aperture correction is disclosed in U.S. Pat. No. 3,629,498. It is indicated that by using the interlaced line scanning prescribed in television standards, the combining of the signals of directly adjacent lines requires a delaying element having a delay time of one field period, whereas two delay elements having a delay time of one line period are sufficient if not the directly adjacent but the lines situated one line further on are utilized. The use of a delay element having a time delay of one field period has the drawback of motion unsharpness in the case of moving components in the scene to be televized which move during the field period. The use of delay elements having a time delay of a line period has the drawback of a gross accentuation of signal transitions on display; the information of places (lines) which are too remote from one another are utilized for signal combination.

Said Patent discloses a vertical aperture correction circuit in which a combination of a delay element having a time delay of one field period and two delay elements having a time delay of two line periods are used, eliminating the drawbacks of both.

SUMMARY OF THE INVENTION

It is an object of the invention to provide a solution for the described drawbacks which does not require the use of an expensive and motion unsharpness-producing delay element having a delay time of one field period, whereas in addition, further signal processing with combined information of directly adjacent lines for picture quality inmprovement is possible. In this end, the television camera according to the invention is characterized in that the line scanning frequency of the line scanning generator of the camera is twice the line frequency laid down in the standard, so that the same, non-interlaced line raster occurs at the picture pick-up device in each standard field period, the video signal output of the pick-up divice with the video signal occurring at double the line frequency and the standard field frequency being connected through said signal processing circuit to a line duration converter circuit for converting the video signal occurring with half the standard line periods into a video signal occurring with the standard line periods.

A simple embodiment of the television camera as regards the line duration conversion is characterized in that the line duration converter circuit comprises a switch-over switch provided with a master contact connected to the output of the signal processing circuit, with selector contacts and with a switching signal input, two of the selector contacts being connected to signal expansion and delay elements, these two selector contacts carrying in a field period successively in one cycle the information associated with odd-numbered scanning lines and in the next field period the information associated with the even-numbered scanning lines, the signal expansion and delay elements being implemented for a dual signal expansion.

A further simple embodiment is characterized in that the outputs of the signal expansion and delay elements are connected to two selector contacts of a second switch-over switch which furthermore comprises a master contact as the output and a switching signal input and in that, alternately, during standard line periods, either the one or the other selector contact is connected to the master contact, while during this connection to one of the signal expansion and delay elements, the selector contact of the first-mentioned switch-over switch, connected to the relevant signal expansion and delay element, is disconnected from the master contact.

A television camera in which the signal processing circuit is implemented as a vertical aperture correction circuit is characterized in that the circuit is provided with two series-arranged signal delay elements having a delay time equal to half a standard line period.

A television camera in which a different signal processing for the picture quality improvement takes place is characterized in that the signal processing circuit is implemented for interlace flicker reduction and comprises a signal delay element having a delay time equal to half a standard line period, the input and the output of which are connected to inputs of an adder stage the output of which is connected to the output of the signal processing circuit.

DESCRIPTION OF THE DRAWINGS

The invention will now be further explained by way of non-limitative example with reference to a drawing in which.

DESCRIPTION OF THE PREFERRED EMBODIMENT

Figure 1:
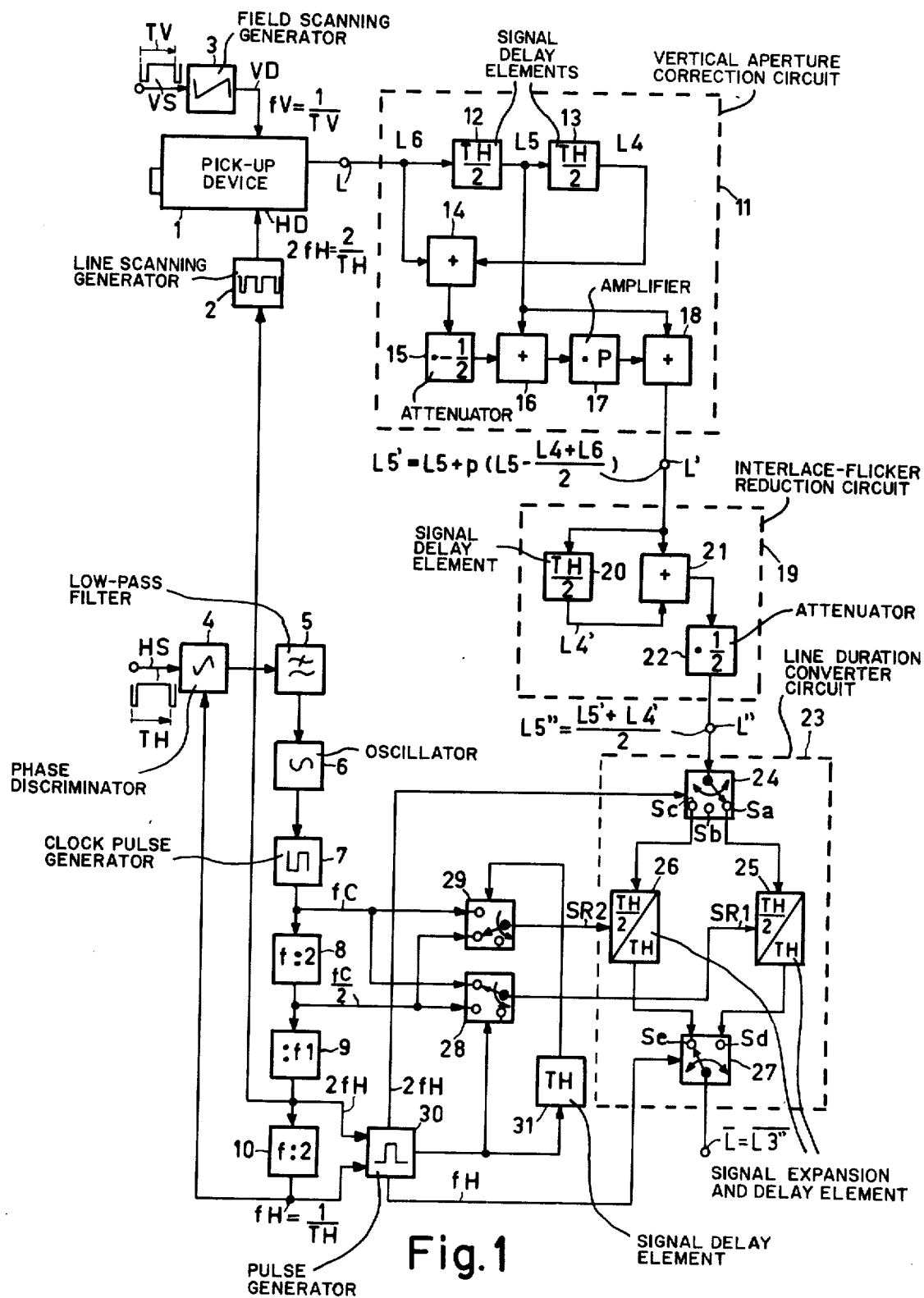
FIG. 1 shows an embodiment of a television camera according to the invention and FIG. 2 shows, versus the time, some signals and switch positions occurring in the camera shown in FIG. 1.

In FIG. 1 reference numeral 1 denotes a television picture pick-up device. For the pick-up device 1 only those components are shown in detail which are essential for explaining the invention, such as a line scanning signal generator 2 and a field scanning signal generator 3. The construction of the pick-up device 1 with one or more pick-up tubes and/or solid state pick-up elements for black-white or colour television is left out of consideration. Only for explaining the function of the blocks 2 and 3 as line and field scanning generator a pulse-shaped and a sawtooth-shaped changing signal are shown therein, corresponding to an inductive or ohmic character respectively of line or field deflection coils respectively used in which a sawtooth-like changing current must be generated. For the general case it is assumed that the pick-up device 1 converts picture information via a line raster into a video signal L occurring at an output.

A field synchronizing signal VS, which changes in a pulse-shaped manner and occurs with a field period TV, so that generator 3 supplies a field scanning signal VD with a field frequency $fV = 1/TV$, is applied to an input of field scanning generator 3. The field frequency and field period are prescribed in a television standard such as, for example, the CCIR-standard, RTMA-standard or another black-white or colour television standard. In the CCIR standard TV=20 ms, so fV=50 Hz.

Contrary to the customary standardized line scanning, the line scanning in the camera according to the invention takes place at a rate which is twice as high. For the line scanning generator 2 it is indicated that it supplies a line scanning signal HD with a frequency 2 fH=2/TH, fH or TH respectively being the standard line frequency or period. In the CCIR-standard TH=64 μs, so fH=15625 Hz.

The result is that with the pick-up device 1 twice as many lines as customary are scanned in a standard field period TV, which furnishes, for the CCIR-standard, a number of 625 lines per field period TV. It is furthermore of importance that the same line raster is always scanned in each field period TV. Plotted in FIG. 2 as a function of the time t there are the field synchronizing signal VS, a video signal L containing the information of a sequence of scanned lines L1, L2, L3, . . . to L625 inclusive in the standard field period TV and the associated line scanning signal HD. Furthermore, a line synchronizing signal HS, which changes in a pulse-shaped manner versus the standard line period TH, is plotted in FIG. 2. In addition, this signal HS is shown in FIG. 1 at an input of a phase discriminator 4, to another input of which a signal having the line frequency fH is supplied for controlling the phase in a phase control loop having the additional components 5 to 10 inclusive. In the phase control loop (4–10) the output of the descriminator 4 is connected via a lowpass filter 5 to the frequency control input of an oscillator 6. The output of the oscillator 6 is connected to the linput of a clock pulse generator 7 which supplies clock pulses with a frequency fC. The output of the generator 7 is connected to a series arrangement of three frequency dividers 8, 9 and 10 having a divisor equal to 2, f1 and 2 respectively. The frequency divider 9 supplies a signal of double the line frequency 2fH to the line scanning signal generator 2, and the frequency divider 10 supplies the signal of line frequency fH to the discriminator 4. The clock pulse frequency fC=4×f1×fH Hz is, for example, in the order of magnitude of 20 MHz. It holds, for example, that f1=320 for the specified CCIR example.

For explaining the advantages obtained for the pick-up device 1 by the line scanning which is twice as rapid as the customary line scanning, two signal processing circuits will first be described. The output of the pick-up device 1 at which the video signal L (FIG. 2) occurs, is connected to the input of a vertical aperture correction circuit 11. The circuit comprises two series-arranged signal delay elements 12 and 13, each having a delay time equal to half the standard line period TH/2. The input of the element 12 and the output of the element 13 are connected to the inputs of an adder stage 14 which is connected from its output to an input of another adder stage 16 via an attenuator 15 having a factor −½. The other input of the stage 16 is connected to the output of the element 12. The output of the stage 16 is connected via an amplifier 17 having a factor p to an input of a third adder stage 18, the other input of which is connected to the output of the element 12. The output of the adder stage 18 constitutes the output of the vertical aperture correction circuit 11 at which an aperture-corrected video signal L' occurs.

In FIG. 1 it is shown that at an occurrence of the information of the lines L6, L5 and L4 at the inputs and outputs of the elements 12 and 13 the output of circuit 11 carries an aperture-corrected signal $$L5'=L5+p(L5-(L4+L6)/2)$$

It appears that for the aperture correction with the information of the line L5, the information of the two spatially directly adjacent lines L4 and L6 are utilised. This assures that an optimum aperture correction can be used, namely with the aid of the directly spatially adjacent lines without the presence of a delay element causing motion unsharpness and having a delay time of one field period.

A second implementation of a possible signal processing circuit is denoted by 19. The circuit 19 is used for interlace-flicker reduction and comprises, connected to the switching input, a signal delay element 20 having a delay time equal to half a standard line period TH/2. The input and the output of the element 20 are connected to inputs of an adder stage 21. The output of the adder stage 21 is connected via an attenuator 22 having a factor ½ to the output of the circuit 19 at which a video signal L" is present which is on the one hand aperture-corrected and on the other hand has been submitted to a flicker reduction. Starting from the signal L'=L5' shown in FIG. 1, at the switching input it follows that with the signal L4' present at the output of the delay element 20 the switching output carries the signal $$L5''=(L5'+L4')/2$$

It appears that for the interlace-flicker reduction at the signal of line L5 the information of the immediately preceding line (L4 relative to L5) is utilised. It holds that an optimum reduction is possible by means of the information of the immediately preceding line without the use of a delay element having a delay time of a field period which, for moving portions of the picture, results in a reduced signal correlation and, consequently, in a flicker reduction which is not optimum.

Figure 2:
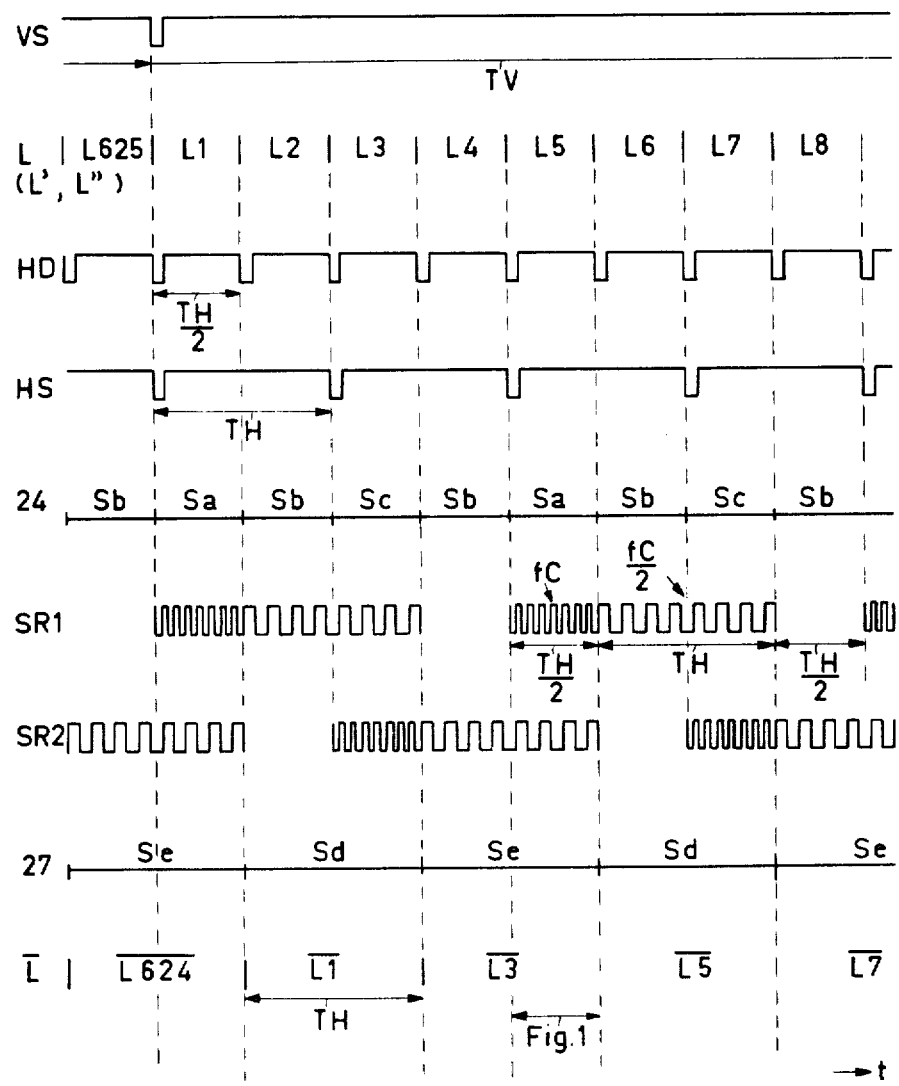

Not considering the two performed corrections and the time delay it was submitted to, the corrected signal L" is furthermore similar to the video signal L supplied by the pick-up device 1 so that for the further description of the operation of the camera reference is made to the signal L(L', L") of FIG. 2. In FIG. 1 the corrected signal L" is applied to an input of a line duration converter circuit 23, namely to a master contact of a switch-over switch 24. For simplicity, the switch-over switch 24 is shown in the drawing as a mechanical switch but a practical implementation will be electronically, which also applies to further switches still to be described. The switchover switch 24 is provided with three selector contacts Sa, Sb and Sc. For explaining the switch-over cycle, FIG. 2 shows at 24 the consecutive selector contact through-connections; as shown in FIG. 1 the switching arm swings to and fro. The selector contact Sb of switchover switch 24 is free, while the selector contacts Sa and Sc are each connected to one of the inputs of a pair of signal expansion and delay elements 25 and 26, respectively. The elements 25 and 26 are analog shift registers which can be written in and read at various speeds. Charge transfer devices (CTD's) can, for example, be used. In a digital implementation other storage elements can be used too, such as, for example, a random access memory. An adapted control is then required. The outputs of the elements 25 and 26 are connected to selector contacts Sd and Se, respectively, of a switch-over switch 27, the master contact of which is connected to the output of the circuit 23. In FIG. 2 reference numeral 27 denotes the switching cycle of the selector contacts Sd and Se. A signal $\overline{L}$, whose variation versus the time is shown in FIG. 2, is indicated at the output of the switch 23. Starting from the information alreadly described for FIG. 1 of the lines L4, L5 and L6 it follows for the signal $\overline{L}$ that:

$$\overline{L}=\overline{L3}=$$

Four control signals are applied to the line duration conversion circuit 23 for control. The respective signals SR1 and SR2, shown in FIG. 2, are applied to the signal expansion and delay elements 25 and 26. The signal SR1 is obtained by means of a switch-over switch 28, two of the selector contacts of which are connected to the output of the clock pulse generator 7 and of the frequency divider 8, respectively, a third selector contact is free. The signal SR2 is likewise obtained by means of a switch-over switch 29. Switching of switch-over switches 28 and 29 is performed under the control of a pulse generator 30 which is connected by means of two inputs to the output of the frequency dividers 9 and 10, respectively, the output being connected directly or via a delay element 31, having a delay time of one line period TH, to the switching signal input of switch-over switch 28 and 29, respectively. The switching signal, derived from the pulse generator 30 for the switch-over switches 28 and 29, is so construed from the signals of line frequency fH and double the line frequency 2fH that the clock pulses of the frequency fC are passed during half a line period TH/2 and, thereafter, the clock pulses having the frequency fC/2 during a line period TH, while thereafter the free contact is connected during half a line period TH/2. In addition, the pulse generator 30 supplies, in the proper phase relation, a signal of the frequency 2fH and fH respectively to the switching signal input of the switch-over switches 24 and 27.

The clock pulse frequency fC and half the clock pulse frequency fC/2 are indicated at the control signal SR1 of FIG. 2. During the occurrence, in half the line period TH/2, of the clock pulses of frequency fC, the information associated with line L5 is entered in device 25. The positions of the switch-over switches 24, 27, 28 and 29, shown in FIG. 1, are associated herewith, as denoted in FIG. 2 by means of FIG. 1. It follows that device 26 is read simultaneously under the control of the clock pulses of frequency fC/2. As a result the information originating from line L3 (signal L in FIG. 2) becomes available, this information ($\overline{L3}$), however, having been submitted to an expansion because the reading speed is half the writing speed with the device 26. It follows from FIG. 2 that the information originating from the lines L1, L3, L5, L7 etc. and present during half the line periods TH/2 (signal L) are present in the signal $\overline{L}$ during line periods TH ($\overline{L1}$, $\overline{L3}$, $\overline{L5}$, $\overline{L7}$).

For completeness it should be noted that the dual signal expansion (from signal L to signal $\overline{L}$) is accompanied by a bandwidth halving for the expanded signals. With the requirement of approximately a 5 MHz bandwidth for the expanded signals, which than fully satisfy the requirements laid down in the television standard, it follows that the signal L, generated by the pick-up element 1 must have a bandwidth of 10 MHz. This requirement can be satisfied with the present pick-up devices. It furthermore holds that the delay elements 12, 13 and 20 must be suitable for a bandwidth of 10 MHz, but there is the advantage that the delay time is only half a line period TH/2. The preceding example for the clockpulse frequency fC=20 MHz suits the 10 MHz bandwidth of the signal L" as the (writing) sampling frequency must be at least double the highest signal frequency.

FIG. 2 shows the derivation of the expanded signal $\overline{L}$ from the signal L at the field transition $\overline{L624}/$, $\overline{L1}$. The field transition $\overline{L625}$, $\overline{L2}$ occurs automatically at the end of an odd field ($\overline{L1}$, $\overline{L3}$, $\overline{L5}$...) whereafter an even field ($\overline{L2}$, $\overline{L4}$, $\overline{L6}$,...) occurs. For completeness it should be noted that with the devices 25 and 26 a cycle of four fields occurs, namely the information of, for example, line L1 is processed in the first (odd) field by means of the device 25, in the second (even) field the information of the line L1 is not processed; in the third (odd) field processing takes place by means of the device 26 and in the fourth (even) field there is again no processing.

What is claimed is:

1. A television camera comprising a picture pick-up device, a line scanning signal generator and a field scanning signal generator each coupled to the picture pick-up device for the line-by-line and field-by-field conversion of optical picture information into a video signal occurring with line and field periods as specified in television standards, and a signal processing circuit coupled to the output of said picture pick-up device for improving the picture quality on display by combining information of adjacent lines for forming the video signal, and a line duration converter circuit coupled to the output of the signal processing circuit, wherein the line scanning frequency as provided by the line scanning signal generator is twice the standard line frequency as specified in television standards, so that the same, non-interlaced line raster occurs at the picture pick-up device in each standard field period, the video signal output of the pick-up device, the video signal occurring at double the standard line frequency and at the standard field frequency, being first processed in said signal processing circuit, and then being converted in said line duration converter circuit from a signal with half the standard line periods into a video signal with the standard line periods.

2. A television camera as claimed in claim 1, wherein the line duration converter circuit comprises a switch-over switch provided with a master contact connected to the output of the signal processing circuit, and selector contacts and with a switching signal input, and a pair of signal expansion and delay elemnts, two of the selector contacts being respectively connected to an input of each of the signal expansion and delay elements, these two selector contacts carrying in a field period, successively in one cycle, the information associated with odd-numbered scanning lines and in the next field period the information associated with the even-numbered scanning lines, the singal expansion and delay elements being implemented for a dual signal expansion.

3. A television camera as claimed in claim 2, wherein the outputs of the signal expansion and delay elements are respectively connected to two selector contacts of a second switch-over switch which includes a master contact as the output and a switching signal input and in that alternately, during standard line periods either the one or the other selector contact is connected to the master contact, while, during this connection to one of the signal expansion and delay elements, the selector contact of the first-mentioned switch-over switch, connected to the relevant signal expansion and delay element, is disconnected from the master contact.

4. A television camera as claimed in claim 1, 2 or 3 wherein the signal processing circuit comprises a vertical aperture correction circuit having two series-arranged signal delay elements each with a delay time equal to half a standard line period.

5. A television camera as claimed in claim 4 wherein the signal processing circuit further comprises an interlace-flicker reduction circuit which includes a signal delay element having a delay time equal to half a standard line period and an adder stage, the input and the output of the delay element are connected to inputs of the adder stage, the output of which is coupled to the output of the signal processing circuit.

6. A television camera as claimed in claims 1, 2 or 3 wherein the signal processing circuit further comprises an interlace-flicker reduction circuit which includes a signal delay element having a delay time equal to half a standard line period and an adder stage, the input and the output of the delay element are connected to the inputs of the adder stage, the output of which is coupled to the output of the signal processing circuit.

* * * * *